United States Patent
Wang et al.

(10) Patent No.: US 6,875,480 B2
(45) Date of Patent: Apr. 5, 2005

(54) METHOD OF ENHANCEMENT OF ELECTRICAL CONDUCTIVITY FOR CONDUCTIVE POLYMER BY USE OF FIELD EFFECT CONTROL

(75) Inventors: Tsung-Hsiung Wang, Ta-Li (TW); Jing-Pin Pan, Hsing-Chu Hsien (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 9 days.

(21) Appl. No.: 10/083,366

(22) Filed: Feb. 27, 2002

(65) Prior Publication Data
US 2003/0161968 A1 Aug. 28, 2003

(51) Int. Cl.[7] .............................. H05H 1/46; B05D 3/06; C08J 7/18
(52) U.S. Cl. ...................... 427/535; 427/536; 427/539; 427/488; 427/481; 427/575; 427/598; 427/457
(58) Field of Search .................................. 427/488, 491, 427/536, 539, 575, 535, 537, 547, 598, 457

(56) References Cited

U.S. PATENT DOCUMENTS

| | | | | |
|---|---|---|---|---|
| 4,395,434 A | * | 7/1983 | Imada et al. | |
| 5,241,186 A | * | 8/1993 | Yunogami et al. | 250/492.3 |
| 5,853,819 A | * | 12/1998 | Lelental et al. | 427/537 |
| 6,242,054 B1 | * | 6/2001 | Baalmann et al. | 427/489 |
| 6,512,020 B1 | * | 1/2003 | Asakura et al. | 522/57 |
| 6,558,219 B1 | * | 5/2003 | Burroughes et al. | 427/66 |
| 6,759,083 B2 | * | 7/2004 | Lamotte et al. | 427/64 |

FOREIGN PATENT DOCUMENTS

| DE | 4207422 A1 | * | 9/1993 |
|---|---|---|---|
| JP | 1-255107 | * | 10/1989 |

* cited by examiner

*Primary Examiner*—Marianne Padgett
(74) *Attorney, Agent, or Firm*—Bacon & Thomas

(57) ABSTRACT

The present invention is to provide a method of enhancement of electrical conductivity for conductive polymer by use of field effect control, wherein on the substrate, whose surface was treated with a field, was coated by a containing monomer or oligomer solution of conductive polymer, through a field mechanism a monomer or oligomer of conductive polymer can demonstrate the sequential order molecular structure layer on the substrate, on this molecular structure layer was coated by an available amount of oxidant to proceed the polymerization, it was subjected to a field during polymerization to form 3-dimensional order stacking structure in order to increase the functional characteristic and electrical conductivity for conductive polymer.

13 Claims, 1 Drawing Sheet

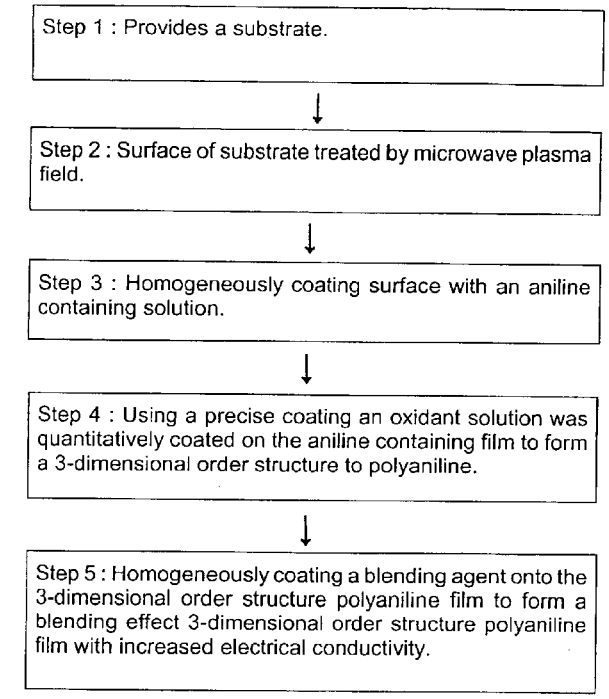

Step 1 : Provides a substrate.

↓

Step 2 : Surface of substrate treated by microwave plasma field.

↓

Step 3 : Homogeneously coating surface with an aniline containing solution.

↓

Step 4 : Using a precise coating an oxidant solution was quantitatively coated on the aniline containing film to form a 3-dimensional order structure to polyaniline.

↓

Step 5 : Homogeneously coating a blending agent onto the 3-dimensional order structure polyaniline film to form a blending effect 3-dimensional order structure polyaniline film with increased electrical conductivity.

METHOD OF ENHANCEMENT OF ELECTRICAL CONDUCTIVITY FOR CONDUCTIVE POLYMER BY USE OF FIELD EFFECT CONTROL

FIELD OF THE INVENTION

The present invention is to provide a method of enhancement of electrical conductivity for conductive polymer by use of field effect control, wherein the combination of material structural characteristic, electromagnetic field mechanism, and a precision coating engineering solves problems of the conventional conductivity and fabrication process to obtain an excellent electrical conductivity, isomeric order structure, fabrication reducing, fast forming, and the conductive polymer be more practical.

BACKGROUND OF THE INVENTION

At present, since the organic conductive polymer demonstrates the metal-like characteristics of electric and magnetic field, and also possesses the physical and mechanical properties of the conventional organic polymer, it can be applied to the nowadays high-tech products such as electronic devices, chemical and biochemical sensor, electroluminescent display, corrosion resistant painting, anti-static/static resistant/protective static, electromagnetic wave interference resistant, battery, electrodes, etc.; since the organic conductive polymer is composed of the organic molecule material, various composition and structure of the composed molecule demonstrates different functional characteristic, and affects the applied types and scope. Polyaniline is an intrinsically conductive polymer (ICP), and it possesses the functional characteristics such as electrical conductivity, magnetic conductivity, photochromism, electrochromism, piezoelectricity, etc., and it is very easily to get the raw material and to be prepared, and also has high stability for environment, for the photoelectronic products it is a very suitable and ideal applied material. However, since the conventional conductive polyaniline demonstrates entanglement phenomenons due to the coupling effect mechanism of intrachain and interchain in the composed structure, it results in the type of solid or pellet, bad conductivity, and hard soluble in usual solvents; besides, its glass transition temperature (Tg) is only slight higher than the decomposition temperature (Td), it is very difficult to handle in the type of dissolving and melting, hence it directly influences the process of conductive polyaniline, moreover, it limits to its application levels and scope. Therefore, in order to solve problems of polyaniline process described above lots of patents demonstrate the corresponding methods, e.g. U.S. Pat. Nos. 4,983,690 and 5,494,609 disclose that polyaniline was blended with other organic polymer to increase an electrical conductivity and the processed method, U.S. Pat. Nos. 5,518,767 and 5,536,573 utilize the attraction of positive and negative charges on the polymer chain, through molecular self-assembly to obtain the aim of the enhancement of electrical conductivity, U.S. Pat. No. 5,776,370 utilizes the blending agent with protic acid to form charge transfer complexes to increase an electrical conductivity of polyaniline, and U.S. Pat. No. 5,928,566 discloses that the addition of plasticizer to polyaniline increases the crystallinity of polyaniline molecule to enhance the electrical conductivity of polyaniline, U.S. Pat. No. 6,018,018 utilizes a kind of polyanion/polycation or a functional oligomer/polymer served as a template for aniline polymerization, and aniline is able to be absorbed on a template to proceed the sequential order polymerization by addition of catalyst to achieve the aims of water-soluble and increasing an electrical conductivity. Although the components or fabrication methods described in those patents help the enhancement of electrical conductivity or process for polyaniline, but it is very difficult to achieve an excellent electrical conductivity, in situ, isomeric order structure, reducing fabrication, fast forming, electrical conductivity control, and the requirement of increasing functional characteristic, for the practical application it is still limited by the source of fabrication materials, demands of functional characteristics, demands for the thickness of conductive film, combination of processed fabrication, and types of electrically conductive mechanism. For examples, PANI+-DBSA-blending polyaniline contains the conjugated structure skeleton of polyaniline, the branched chain functional structure of dodecylbenzenesulfonic acid (DBSA), the presence of positive-negative charges in the charge transfer complex, various configurations of molecular structure combination, etc. From aniline monomer, aniline dimer, aniline oligomer, and polyaniline polymer to demonstration of the functional characteristics for polyaniline and the applied efficiency of products, a variety of characteristic deeds in the process in whatever it is a solid, a liquid, a thin film type, a linear type, a penetrated type, a net structure, a crystalline, a non-crystalline, or an amorphous type, etc., for electricity, magnet, light, heat, sound, force, etc. energy field it demonstrates different molecular structure configurations and illustrates different functional characteristics according to how much levels of field affect and how much differences of mechanism influence. Therefore, if it masters and controls the molecular structure and configuration of conductive polymer in order that it demonstrates the corresponding functional mechanism. During the formation of polymer, i.e. the practical system possesses the configurational structure of a order conductive mechanism, and it is not necessary to proceed the dissolving or melting process and directly solves the problems of electrical conductivity and fabrication process, it should be the key to a practical conductive polymer, and is a driving force to develop the scope of applied domain.

SUMMARY OF THE INVENTION

Hence, the aim of this invention is to solve the drawbacks described above. In order to avoid the presence of the drawbacks described above, the present invention is to provide a method of enhancement of electrical conductivity for conductive polymer by use of field effect control, through the mechanism of an electromagnetic field it masters and controls the molecular structure and configuration of conductive polymer, and increases an electrical conductivity for conductive polymer largely.

The other aim of the present invention is to provide a method of enhancement of electrical conductivity for conductive polymer by use of field effect control, during the formation of polymer i.e. a practical system possesses three dimensional configurational structure of a order conductive mechanism, and it is not necessary to proceed the dissolving or melting process, and directly solves the problems of electrical conductivity and fabrication process to achieve the conductive polymer be more practical.

In order to obtain the aims described above, the present invention is to provide a method of enhancement of electrical conductivity for conductive polymer by use of field effect control, wherein on the substrate, whose surface was treated with a field, was coated by a containing monomer or oligomer solution of conductive polymer, through a field effect a monomer or oligomer of conductive polymer was able to demonstrate the sequential order molecular structure layer on the substrate, on this molecular structure layer was coated by an available amount of oxidant to proceed the polymerization, it was subjected to a effective field during polymerization to form 3-dimensional order stacking structure in order to control the molecular structure and configuration for conductive polymer growth and directly to solve the problems of electrical conductivity and fabrication process and to increase the functional characteristic and electrical conductivity for conductive polymer.

BRIEF DESCRIPTION OF THE DRAWINGS

1. Description of the Drawings:

FIG. 1 illustrates the sequential and stacking structure of polyaniline molecule by use of field control in the present invention.

DESCRIPTION OF THE PREFFERED EMBODIMENT

The present invention is to provide a method of enhancement of electrical conductivity for conductive polymer by use of field effect control, wherein conductive polymer can be selected from polyaniline, polypyrrole, and polythiophene, ect., among them polyaniline is the best. For an example of polyaniline as a conductive polymer it takes an available amount of aniline monomer or oligomer be dissolved in an available amount of solvent, in which aniline can also be selected from substituted alkyl, alkoxy, aryl, hydroxyl, amino, or halogen with a hydrogen atom or more hydrogen atoms on aniline, e.g. 2- and 2,5-substituted methyl anilines, 2- and 2,5-substituted ethyl or propyl anilines, 2-substituted methoxy or ethoxy anilines, 4-phenyl substituted anilines, 2-chloro, 2-fluoro substituted anilines, 2- and 4-amino substituted anilines, and 2- and 4-hydroxyl substituted anilines. Hydrogen atoms on the nitrogen position on aniline can also be substituted by methyl, propyl, butyl, and phenyl group, i.e. N-methyl, N-propyl, N-butyl, and N-phenyl substituted anilines.

Solvent can be selected from one of the following: N-methylpyrrolidone (NMP), dimethylsulfoxide (DMSO), dimethylformamide (DMF), pyridine, toluene, xylene, m-cresol, decalin, phenol, dimethylacetamide, tetramethylurea, pyrrolidone, benzyl alcohol, aqueous acetic acid, aqueous formic acid, etc.

Step 1 in FIG. 1 illustrates a substrate, wherein on the top surface of substrate it applies to a microwave plasma field control treatment with a low power to achieve the positional absorption for aniline monomer, aniline dimer, aniline oligmer, or aniline polymer and possessing the template function surface. Step 2 in FIG. 1 illustrates gas employed to excite plasma is oxygen, argon, hydrogen, carbon tetrafluoride, and other activated gas. Step 3 in FIG. 1 illustrates a precise coating method by applying a field functional control, on the surface of substrate treated by microwave plasma field was homogeneously coated by a aniline related solution to form a layer, which possesses a positional order stacking arrangement for an aniline film molecular structure.

Step 4 in FIG. 1 illustrates by using a precise coating engineering the oxidant solution was quantitatively coated on an aniline film, which possesses a positional order stacking arrangement for molecular structure, to proceed the aniline polymerization, and through a dispersing mechanism and another electromagnetic field control it forms a possessing 3-dimensional order structure polyaniline film; the oxidant can be selected from potassium bichromate, ammonium persulfate, hydrogen peroxide, ceric sulfate, and chromic chloride. Step 5 in FIG. 1 illustrates by using a precise coating engineering the blending agent was homogeneously coated onto a possessing 3-dimensional order structure polyaniline film to proceed a blending effect reaction to form a possessing blending effect 3-dimensional order structure polyaniline film to increase an electrical conductivity of polyaniline. The doping agent can be selected from a series of aromatic protic acids, e.g. benzenesulfonic acid (BSA), dodecylbenzenesulfonic acid (DBSA), p-toluenesulfonic acid (PTSA), nitrobenzenesulfonic acid, naphthalenesulfonic acid, and 10-camphorsulfonic acid.

The coating tool be used in a precise coating engineering described above is a possessing electricity, magnet, heat, force, etc. combinational field design to develop the field control function, the coating thickness range is 100 Å~100 µm. Electrical field is a direction current or an alternating current, magnetic field is >2500 gauss, the force field of coating tool is a contact force field, which can be a ordered micro-fluid force field, a porous micro-fluid force field, a tension force field, or a condensed pressure force field.

Preparation of Aniline Monomer and Oligomer Solution

Preparation of aniline monomer and oligomer solution: 36 g of aniline was dissolved in 120 g of toluene, and the solution was vigorously stirred until aniline was completely dissolved in toluene, called as solution A. 12 g of dodecylbenzenesulfonic acid (DBSA) was dissolved in 200 ml of water, and the solution was vigorously stirred until DBSA was completely dissolved in water, then 36 g of 37% hydrochloric acid was added, and the solution was vigorously stirred until the solution became milky white color cream, called solution B. Mixed solution A and solution B together directly, vigorously stirred 30 minutes, after placed 2 hours, the solution was divided into two layers, the upper layer was oil layer, and the bottom layer was water layer; the solution was separated by a separated funnel, the upper layer was aniline monomer and oligomer solution.

The following comparative examples are not examples of the invention but are without the field effect control according to the present invention.

Comparative Example 1

The above prepared aniline monomer and oligomer solution was coated onto a PET film surface, a wet film is about 1.5 µm, the solvent was evaporated automatically at the room temperature to form an aniline related film about 0.3 µm. Then, an available amount of oxidant solution was coated onto an aniline related film to proceed polymerization to produce the polyaniline film, finally, the polyaniline film was placed in an oven to be baked at 100° C. for 10 min. By using a four-point probe measurement instrument equipment to measure the electrical conductivity of this polyaniline film the valve is about $2 \times 10^{-2}$ S/cm.

Comparative Example 2

A substrate surface with a plasma field treatment was coated with a polyaniline film, which is no treatment with a field control structure ordered; a PET film was treated with 50 watts of microwave oxygen plasma for 5 min., and then the above prepared aniline monomer and oligomer solution was coated onto a PET film surface, a wet film is about 1.5 µm, the solvent was evaporated automatically at the room temperature to form an aniline related film about 0.3 µm. Then, an available amount of oxidant solution was coated onto an aniline related film to proceed polymerization to produce the polyaniline film, finally, the polyaniline film was placed in an oven to be baked at 100° C. for 10 min. By using a four-point probe measurement instrument equipment to measure the electrical conductivity of this polyaniline film the value is about 7.5 S/cm.

Comparative Example 4

The above prepared aniline monomer and oligomer solution was homogeneously coated onto a PET film surface by using a combination fields effect with a 2 ampere of electrical field, 3000 gauss of magnetic field, and a sequential ordered fluid force field, a wet film is about 1.5 μm, the solvent was evaporated automatically at the room temperature to form an aniline related film about 0.3 μm. Then, an available amount of oxidant solution was coated onto an aniline related film to proceed polymerization to produce the polyaniline film by using a combination fields effect with a 2 ampere of electrical field and 3000 gauss of magnetic field, finally, the polyaniline film was placed in an oven to be baked at 100° C. for 10 min. By using a four-point probe measurement instrument equipment to measure the electrical conductivity of this polyaniline film the value is about 2.5 S/cm.

EXAMPLE 1

A PET film was treated with 50 watts of microwave oxygen plasma for 5 min., and then the above prepared aniline monomer and oligomer solution was homogeneously coated onto a PET film surface by using a combination fields effect with a 2 ampere of electrical field, 3000 gauss of magnetic field, and a sequential ordered fluid force field, a wet film is about 1.5 μm, the solvent was evaporated automatically at the room temperature to form an aniline related film about 0.3 μm. Then, an available amount of oxidant solution was coated onto an aniline related film to proceed polymerization to produce the polyaniline film by using a combination fields effect with a 2 ampere of electrical field and 3000 gauss of magnetic field, finally, the polyaniline film was placed in an oven to be baked at 100° C. for 10 min. By using a four-point probe measurement instrument equipment to measure the electrical conductivity of this polyaniline film the value is about 100 S/cm.

As is evident from Example 1 of the present invention the electrical conductivity of the polyaniline film is about 100 S/cm as compared to the lesser values of the Comparative Examples of about $2 \times 10^{-2}$ S/cm to 7.5 S/cm.

This invention specially discloses and describes selected the best examples. It is to be understood, however, that this invention is not limited to the specific features shown and described. The invention is claimed in any forms or modifications within the spirit and the scope of the appended claims.

What is claimed is:

1. A method of enhancing electrical conductivity of a conductive polymer by using field effect control which comprises the following steps:
    (a) subjecting a substrate surface to a microwave plasma field treatment to facilitate the conductive polymer monomer, dimer, oligomer or polymer being positional absorbed on the substrate;
    (b) homogeneously coating the plasma treated substrate surface with a conductive polymer solution while applying a field effect control to form a positional order stacking molecular structure for a conductive polymer film, wherein the field is a microwave field, electric field, magnetic field, fluid force field, or a combination thereof; and then
    (c) employing a molecular structure ordered field control and a self-stacking field control by subjecting the coated substrate to an electromagnetic combination field which is a combination of electrical field, magnetic field, or a combination of electrical field, magnetic field and fluid force field to maintain and to strengthen the position and orientation ordered and stacking molecular structure of the conductive polymer to control and to increase the electrical conductivity of the conductive polymer.

2. A method of enhancing electrical conductivity for the conductive polymer by use of field effect control of claim 1 wherein the conductive polymer is polyaniline, polypyrrole, or polythiophene.

3. A method of enhancing electrical conductivity for the conductive polymer by use of field effect control of claim 2 wherein the polymer is a substituted alkyl, alkoxy, aryl, hydroxyl, amino, or halogen substituted aniline polymer.

4. A method as claimed in claim 3 wherein the polymer is formed from an aniline compound which is 2- or 2,5-substituted methyl anilines, 2- and 2,5-substituted ethyl or propyl anilines, 2-substituted methoxy or ethoxy anilines, 4-phenyl substituted anilines, 2-chloro, 2-fluoro substituted anilines, 2- and 4-amino substituted anilines, or 2- and 4-hydroxyl substituted anilines.

5. A method as claimed in claim 4 wherein hydrogen atoms on the nitrogen position of the aniline rings are substituted by methyl, propyl, butyl, or phenyl groups.

6. A method of enhancing electrical conductivity for the conductive polymer by use of field effect control of claim 2 wherein an oxidant is applied to the film in step (c) which oxidant is potassium bichromate, ammonium persulfate, hydrogen peroxide, ceric sulfate, or chromic chloride.

7. A method of enhancing electrical conductivity for the conductive polymer by use of field effect control of claim 2 which further comprises homogeneously coating onto the polymer film formed in step (c) with a blending agent which is selected from the group consisting of a series of aromatic protic acids.

8. A method of enhancing electrical conductivity for conductive polymer by use of filed effect control of claim 7 wherein the blending agent is benzenesulfonic acid (BSA), dodecylbenzenesulfonic acid (DBSA), p-toluenesulfonic acid (PTSA), nitrobenzenesulfonic acid, naphthalene-sulfonic acid, or 10-camphor-sulfonic acid.

9. A method of enhancing electrical conductivity for the conductive polymer by use of field effect control of claim 1 wherein the power of the microwave field in step (a) is >1 watts, the current of the electrical field is >0.1 amperes, and the magnetic field is >500 gauss.

10. A method of enhancing electrical conductivity for conductive polymer as claimed in claim 9 wherein the conductive polymer is polyaniline.

11. A method of enhancing electrical conductivity for the conductive polymer by use of field effect control of claim 1 wherein the plasma field of (a), contains an excited plasma gas which is oxygen, argon, hydrogen, carbon tetrafluoride, or other activated gas.

12. A method of enhancing electrical conductivity for the conductive polymer by use of field effect control of claim 1 wherein the homogenous coating with field functional control in step (b), is a containing electrical field, magnetic field, or fluid force field combinational field function; using a coating tool and coating control system to obtain a coating thickness which is in the range of 100 Å~100 μm.

13. A method of enhancing electrical conductivity for the conductive polymer by use of field effect control of claim 1 wherein the conductive polymer is the polyaniline structural composition comprising aniline, oxidant, and blending agent.

* * * * *